(12) United States Patent
Kimoto et al.

(10) Patent No.: US 11,293,569 B2
(45) Date of Patent: Apr. 5, 2022

(54) THREADED CONNECTION FOR PIPES AND METHOD FOR PRODUCING THREADED CONNECTION FOR PIPES

(71) Applicants: Nippon Steel Corporation, Tokyo (JP); Vallourec Oil and Gas France, Aulnoye-Aymeries (FR)

(72) Inventors: Masanari Kimoto, Tokyo (JP); Masahiro Oshima, Tokyo (JP)

(73) Assignees: Nippon Steel Corporation, Tokyo (JP); Vallourec Oil and Gas France, Aulnoye-Aymeries (FR)

( * ) Notice: Subject to any disclaimer, the term of this patent is extended or adjusted under 35 U.S.C. 154(b) by 0 days.

(21) Appl. No.: 16/643,621

(22) PCT Filed: Aug. 30, 2018

(86) PCT No.: PCT/JP2018/032090
§ 371 (c)(1),
(2) Date: Mar. 2, 2020

(87) PCT Pub. No.: WO2019/044961
PCT Pub. Date: Mar. 7, 2019

(65) Prior Publication Data
US 2020/0400255 A1   Dec. 24, 2020

(30) Foreign Application Priority Data

Sep. 4, 2017  (JP) .............................. JP2017-169097

(51) Int. Cl.
*F16L 15/04* (2006.01)
*C22C 18/00* (2006.01)
(Continued)

(52) U.S. Cl.
CPC .............. *F16L 15/04* (2013.01); *C22C 18/00* (2013.01); *C25D 5/36* (2013.01); *C25D 7/04* (2013.01);
(Continued)

(58) Field of Classification Search
CPC . F16L 15/04; F16L 58/08; F16L 15/00; C22C 18/00; C22C 38/002; C22C 38/02;
(Continued)

(56) References Cited

U.S. PATENT DOCUMENTS

2012/0025518 A1\*  2/2012  Kuranishi ............... C23C 22/83
285/94

FOREIGN PATENT DOCUMENTS

JP   S55-50484 A      4/1980
JP   S-5550484 A  *   4/1980  ............... C25D 3/22
(Continued)

OTHER PUBLICATIONS

Oct. 30, 2018 (WO) International Search Report PCT/JP2018/032090.
English Abstract of WO2008-108263.

*Primary Examiner* — Humera N. Sheikh
*Assistant Examiner* — John D Schneible
(74) *Attorney, Agent, or Firm* — Banner & Witcoff, Ltd.

(57) ABSTRACT

The threaded connection for pipes includes a pin, a box and a Zn—Ni alloy plating layer. The pin has a pin-side contact surface that includes a pin-side thread part. The box has a box-side contact surface that includes a box-side thread part. The Zn—Ni alloy plating layer is formed on at least one of the pin-side contact surface and the box-side contact surface. The Zn—Ni alloy plating layer is consisting of Zn, Ni, trace amount of Cr and impurities. The trace amount of Cr content of the Zn—Ni alloy plating layer is 5.0×10 counts/sec or
(Continued)

more in terms of Cr intensity as measured by secondary ion mass spectrometry using $O_2^+$ ions as bombarding ions.

22 Claims, 5 Drawing Sheets

(51) Int. Cl.
| | |
|---|---|
| *C25D 5/36* | (2006.01) |
| *C25D 7/04* | (2006.01) |
| *F16L 58/08* | (2006.01) |
| *C23C 22/12* | (2006.01) |
| *C22C 38/44* | (2006.01) |
| *C23C 22/18* | (2006.01) |
| *F16L 15/00* | (2006.01) |
| *C22C 38/02* | (2006.01) |
| *C22C 38/00* | (2006.01) |
| *C25D 7/00* | (2006.01) |
| *C22C 38/42* | (2006.01) |
| *C23C 28/00* | (2006.01) |
| *C22C 38/04* | (2006.01) |

(52) U.S. Cl.
CPC ............ *F16L 58/08* (2013.01); *C22C 38/002* (2013.01); *C22C 38/02* (2013.01); *C22C 38/04* (2013.01); *C22C 38/42* (2013.01); *C22C 38/44* (2013.01); *C23C 22/12* (2013.01); *C23C 22/18* (2013.01); *C23C 28/00* (2013.01); *C25D 7/00* (2013.01); *C25D 7/003* (2013.01); *F16L 15/00* (2013.01)

(58) Field of Classification Search
CPC ......... C22C 38/04; C22C 38/42; C22C 38/44; C25D 5/36; C25D 7/04; C25D 7/00; C25D 7/003; E21B 17/042; C23C 22/18; C23C 28/00; C23C 22/12
USPC ......................................... 285/333, 334, 390
See application file for complete search history.

(56) References Cited

FOREIGN PATENT DOCUMENTS

| | | | | |
|---|---|---|---|---|
| JP | S57-67188 A | | 4/1982 | |
| JP | S-5767188 A | * | 4/1982 | ............ C22C 18/00 |
| JP | S58-17285 A | | 2/1983 | |
| JP | S-5817285 A | * | 2/1983 | ........... E21B 17/042 |
| JP | WO-2017110685 A1 | * | 6/2017 | ............ C23C 22/18 |
| JP | WO-2017110686 A1 | * | 6/2017 | ........... C23C 28/321 |
| WO | 2008/108263 A1 | | 9/2008 | |
| WO | 2016170031 A1 | | 10/2016 | |
| WO | 2017/047722 A1 | | 3/2017 | |
| WO | WO-2017047722 A1 | * | 3/2017 | ............... C08K 3/04 |

* cited by examiner

THREADED CONNECTION FOR PIPES AND METHOD FOR PRODUCING THREADED CONNECTION FOR PIPES

TECHNICAL FIELD

The present invention relates to a threaded connection for pipes and a method for producing the threaded connection for pipes.

BACKGROUND ART

Oil country tubular goods are used for drilling in oil fields and natural gas fields. Oil country tubular goods are formed by connecting a plurality of steel pipes depending on the depth of the well. Connection of the steel pipes is performed by fastening together threaded connections for pipes that are formed at the ends of the steel pipes. Oil country tubular goods are lifted and unfastened for inspection and the like, and are then refastened after being inspected, and reused.

A threaded connection for pipes includes a pin and a box. The pin includes an external thread part that is formed in the outer peripheral surface at an end portion of the steel pipe. The box includes an internal thread part that is formed in the inner peripheral surface at an end portion of the steel pipe. In some cases, the pin and the box also include an unthreaded metal contact part. The unthreaded metal contact part includes a metal seal part and a shoulder part. When the steel pipes are being fastened together, the external thread part and internal thread part come in contact with each other, as do the metal seal parts and also the shoulder parts.

The thread parts and unthreaded metal contact parts of the pin and the box repeatedly experience strong friction during thread fastening and unfastening of the steel pipes. If these regions are not sufficiently resistant to friction, galling (unrepairable galling) will occur during repeated thread fastening and unfastening. Therefore, it is necessary for threaded connections for pipes to have sufficient resistance to friction, that is, excellent galling resistance.

Heretofore, heavy metal-containing compound greases have been used to improve the galling resistance. Application of a compound grease to the surface of a threaded connection for pipes can improve the galling resistance of the threaded connection for pipes. However, heavy metals, such as Pb, contained in compound greases may affect the environment. For this reason, the development of a threaded connection for pipes that does not use a compound grease is desired.

Threaded connections for pipes have been proposed which, instead of compound grease, use a grease (referred to as "green dope") which does not contain a heavy metal. For example, in International Application Publication No. WO2008/108263 (Patent Literature 1), a threaded connection for pipes is described which is excellent in galling resistance even when grease that does not contain a heavy metal is used.

A characteristic of the threaded connection for pipes described in International Application Publication No. WO2008/108263 (Patent Literature 1) is that a contact surface of at least one of a pin and a box has a first plating layer composed of a Cu alloy selected from the group consisting of a Cu—Zn alloy and a Cu—Zn—M1 alloy (where "M1" represents one or more types of element selected from the group consisting of Sn, Bi and In). It is described in Patent Literature 1 that, as a result, when a green dope is applied, and even when the threaded connection is dope-free, a threaded connection for pipes is obtained that exhibits sufficient galling resistance.

A threaded connection for pipes described in International Application Publication No. WO2016/170031 (Patent Literature 2) includes a threaded part and a first sealing surface, and a characteristic thereof is that the threaded part and the first sealing surface are coated with a corrosion-resistant and galling-resistant layer made of metal in which zinc (Zn) is the main component by weight.

CITATION LIST

Patent Literature

Patent Literature 1: International Application Publication No. WO2008/108263
Patent Literature 2: International Application Publication No. WO2016/170031

SUMMARY OF INVENTION

Technical Problem

According to the technology described in Patent Literature 1 and Patent Literature 2, galling resistance can be improved by forming a plating layer on the contact surface of the relevant threaded connection for pipes. However, even when the aforementioned technology is used, there have been cases where sufficient galling resistance was not obtained.

An objective of the present invention is to provide a threaded connection for pipes that is excellent in galling resistance, and a method for producing the threaded connection for pipes.

Solution to Problem

A threaded connection for pipes of the present embodiment includes a pin, a box, and a Zn—Ni alloy plating layer. The pin has a pin-side contact surface including a pin-side thread part. The box has a box-side contact surface including a box-side thread part. The Zn—Ni alloy plating layer is formed on at least one of the pin-side contact surface and the box-side contact surface. The Zn—Ni alloy plating layer is consisting of Zn, Ni, trace amount of Cr and impurities. A trace amount of Cr content of the Zn—Ni alloy plating layer is $5.0\times10$ counts/sec or more in terms of Cr intensity as measured by secondary ion mass spectrometry using $O_2^+$ ions as bombarding ions.

A method for producing the threaded connection for pipes of the present embodiment includes an immersion step and a current conduction step. In the immersion step, first, a pin having a pin-side contact surface including a pin-side thread part, and a box having a box-side contact surface including a box-side thread part are prepared. Next, at least one of the pin-side contact surface and the box-side contact surface is immersed in a plating solution. The plating solution contains zinc ions, nickel ions and chromium ions. The concentration of chromium ions in the plating solution is in a range of 30 to 2000 ppm. In the current conduction step, a current is conducted through at least one of the pin-side contact surface and the box-side contact surface that is immersed in the plating solution. By this means, a Zn—Ni alloy plating layer is formed on at least one of the pin-side contact surface and the box-side contact surface.

Advantageous Effects of Invention

A threaded connection for pipes of the present embodiment is excellent in galling resistance. The threaded connection for pipes of the present embodiment is obtained, for example, by the aforementioned production method.

DESCRIPTION OF EMBODIMENTS

Figure 1:
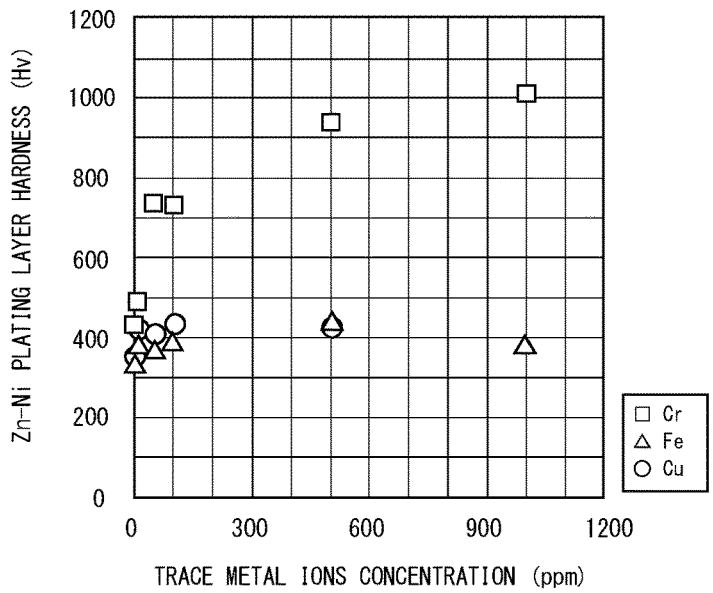
FIG. 1 is a chart illustrating the relation between a trace metal ion concentration in a plating solution and the hardness of a Zn—Ni alloy plating layer.

The present embodiment is described in detail below with reference to the drawings. The same reference symbols are used throughout the drawings to refer to the same or like parts, and description thereof is not repeated.

The present inventors conducted studies regarding galling resistance of threaded connections for pipes. As a result, the present inventors obtained the following findings.

To increase the galling resistance of a threaded connection for pipes during thread fastening and unfastening, it is effective to form a plating layer having a high hardness and a high fusing point on a contact surface that includes a thread part. If the hardness of the plating layer is high, the plating layer is not easily damaged when performing thread fastening and unfastening of the threaded connection for pipes. In addition, if the fusing point of the plating layer is high, when performing thread fastening and unfastening of the threaded connection for pipes, a decrease in the hardness of the plating layer can be suppressed even in a case where a high temperature arises locally in the plating layer. As a result, the galling resistance of the threaded connection for pipes improves.

A Zn—Ni alloy that is a Zn alloy has a sufficiently high hardness and high fusing point. Accordingly, when a Zn—Ni alloy is used to form the plating layer, the galling resistance of the threaded connection for pipes can be increased. In the present description, a plating layer consisting of a Zn—Ni alloy and impurities is referred to as a "Zn—Ni alloy plating layer".

The present inventors conducted studies regarding methods for increasing the hardness of a Zn—Ni alloy plating layer.

Conventionally, three kinds of methods are known as methods for increasing the hardness of a plating layer, namely, (1) addition of an organic addition agent, (2) alloying, and (3) formation of composite plating. (1) In the method that adds an organic addition agent, an organic addition agent that increases the hardness is added to the plating solution. By this means, the hardness of the plating layer increases. An organic addition agent that increases the hardness is, in particular, called a "hardening agent". Hardening agents are commercially available. For example, Cosmo G (trade name) that is a copper sulfate plating solution manufactured by Daiwa Special Chemical Co., Ltd. includes G-1 that is a hardening agent. An example of another hardening agent is polyacrylamide. (2) In the alloying method, alloying elements are added in a quantity ranging from several % to several tens of %, and the plating layer is alloyed. By this means, the hardness of the plating layer increases. Examples of the alloy plating include Zn—Ni alloy plating and Ni—P alloy plating. The Ni—P alloy plating contains 2 to 15 mass % of P, with the balance being Ni and impurities. (3) According to the method which forms composite plating, hard particles such as silicon carbide, alumina or diamond are co-deposited in a plating layer. By this means, the hardness of the plating layer increases.

However, the present inventors obtained a completely different finding from the conventional technology, namely, that the hardness of a Zn—Ni alloy plating layer can be increased by containing a trace amount of a metallic element in the Zn—Ni alloy plating layer.

Conventionally, metal ions other than ions of the metal components (Zn and Ni) of a Zn—Ni alloy plating layer have been thought of as impurities in the plating solution. In other words, a trace amount of metallic elements are impurities in a plating solution for forming a Zn—Ni alloy plating layer. In some cases, impurities in a plating solution cause plating defects. The term "plating defects" refers to, for example, appearance defects and physical property defects. Appearance defects include, for example, pits, rough deposits, dull deposits, irregular appearance and bare spot. Physical property defects include, for example, a decrease in the hardness of the plating layer, a decrease in ductility, and a decrease in adhesiveness. Thus far, attempts have been made to reduce impurities in plating solutions in order to suppress the occurrence of plating defects.

The present inventors investigated the effects in a case where a trace amount of a metallic element that has until now been considered an impurity was caused to be contained in a Zn—Ni alloy plating layer. As a result, the present inventors obtained the follow findings.

FIG. 1 is a chart illustrating the relation between the trace metal ion concentration in a plating solution and the hardness of a Zn—Ni alloy plating layer. Here, the term "plating solution" refers to a plating solution for forming a Zn—Ni alloy plating layer, that is a plating solution which contains zinc ions and nickel ions. The abscissa in FIG. 1 represents the concentration (ppm) of trace amount of metal ions contained in the plating solution. Here, the term "trace amount of metal ions" refers to metal ions other than zinc ions and nickel ions. The ordinate in FIG. 1 represents the Vickers hardness (HV) of the Zn—Ni alloy plating layer. The Vickers hardness is measured by a method in accordance with JIS Z 2244 (2009), in which the test temperature is normal temperature (25° C.) and the test force (F) is 0.01 N.

Referring to FIG. 1, in a case where Fe ions or Cu ions are contained in the plating solution, the hardness of the Zn—Ni alloy plating layer does not change significantly. In addition, if the concentration of Fe ions is more than 900 ppm, the hardness of the Zn—Ni alloy plating layer tends to decrease. However, in a case where the plating solution contains a trace amount of chromium ions, the hardness of the Zn—Ni alloy plating layer noticeably increases. In other words, it was found that the hardness of the Zn—Ni alloy plating layer is increased by causing metallic elements that have hitherto been thought of as impurities to be contained in a trace amount. Further, it was found that among the metallic elements, Cr in particular is effective for increasing the hardness of the Zn—Ni alloy plating layer.

The present inventors studied in detail a Zn—Ni alloy plating layer that was produced using a plating solution containing chromium ions. As a result, the present inventors found that a trace amount of Cr is contained in the Zn—Ni alloy plating layer. In other words, the present inventors found for the first time that the hardness of a Zn—Ni alloy plating layer is increased as a result of containing a trace amount of Cr. Heretofore, Cr has been considered an impurity. Therefore, the finding of the present inventors is completely different from the conventional idea.

Figure 2:
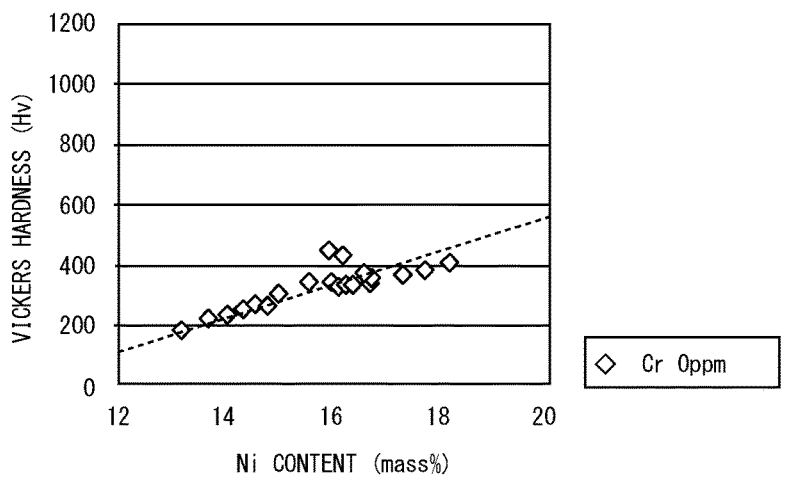
FIG. 2 is a chart illustrating the relation between the Ni content and the hardness of a Zn—Ni alloy plating layer in a case where Cr is not contained.

Normally, the hardness of a Zn—Ni alloy plating layer depends on the Ni content. FIG. 2 illustrates the hardness of Zn—Ni alloy plating layers which were produced using a plating solution having a chromium ion concentration of 0 ppm. In other words, FIG. 2 is a chart illustrating the relation between the Ni content and the hardness of a Zn—Ni alloy plating layer in a case where the Zn—Ni alloy plating layer does not contain Cr. The abscissa in FIG. 2 represents the Ni content (mass %) in the Zn—Ni alloy plating layer. The ordinate in FIG. 2 represents the Vickers hardness (Hv) of the Zn—Ni alloy plating layer. The Vickers hardness was measured by a method in accordance with JIS Z 2244 (2009) in which the test temperature was normal temperature (25° C.) and the test force (F) was 0.01 N.

Referring to FIG. 2, it is found that the hardness of the Zn—Ni alloy plating layer depends on the Ni content. It is found that, in the range in FIG. 2, the hardness of the Zn—Ni alloy plating layer increases in proportion to the Ni content.

Figure 3:
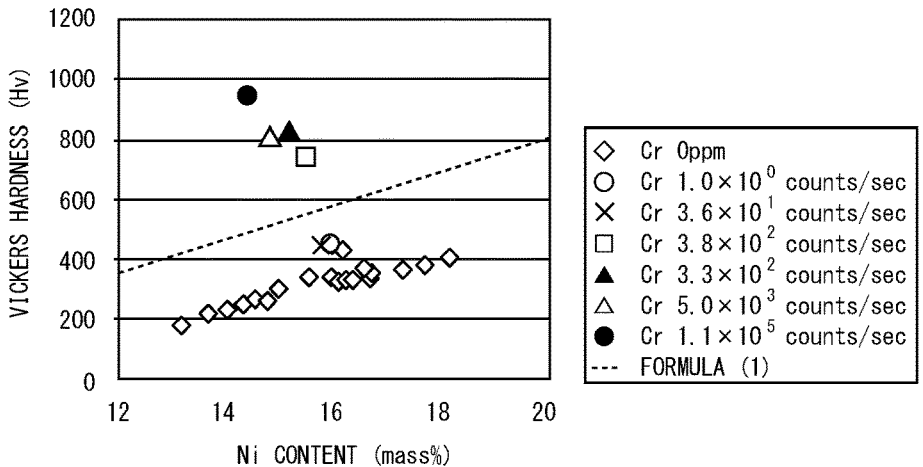
FIG. 3 is a chart illustrating a relation obtained by adding data for the hardness of a Zn—Ni alloy plating layer containing trace amount of Cr to FIG. 2.

FIG. 3 is a chart obtained by adding data for the hardness of Zn—Ni alloy plating layers containing trace amount of Cr to FIG. 2. The data that was added in FIG. 3 was obtained based on examples that are described later. The Cr intensity in the Zn—Ni alloy plating layer is shown in FIG. 3. In this case, the term "Cr intensity" refers to the number of secondary ions of Cr detected by secondary ion mass spectrometry that uses $O_2^+$ as bombarding ions. In FIG. 3, a white circle symbol (○) indicates the hardness of a Zn—Ni alloy plating layer in which the Cr intensity is $1.0 \times 10^0$ counts/sec. In FIG. 3, a cross symbol (×) indicates the hardness of a Zn—Ni alloy plating layer in which the Cr intensity is $3.6 \times 10^1$ counts/sec.

In FIG. 3, a white square symbol (□) a black triangle symbol (▲) a white triangle symbol (△) and a black circle symbol (●) indicate hardnesses of the Zn—Ni alloy plating layer 6 in which the Cr intensity is 5.0×10 counts/sec or more. Referring to FIG. 3, when the Cr intensity of the Zn—Ni alloy plating layer is 5.0×10 counts/sec or more, the hardness of the Zn—Ni alloy plating layer markedly increases. More specifically, when the Cr intensity of the Zn—Ni alloy plating layer is 5.0×10 counts/sec or more, the Vickers hardness of the Zn—Ni alloy plating layer of the present embodiment is shown by Formula (1):

$$\text{Vickers hardness (Hv)} \geq -300 + 55 \times \text{Ni} \tag{1}$$

where, Ni represents the Ni content (mass %) in the Zn—Ni alloy plating layer.

The reason why a trace amount of Cr increases the hardness of the Zn—Ni alloy plating layer is uncertain. There is a possibility that the crystal structure of the Zn—Ni alloy plating layer is changed by a trace amount of co-deposited Cr in the Zn—Ni alloy plating layer.

Normally, a large amount of Cr is not included in a plating solution. As mentioned above, conventionally, metal ions other than zinc ions and nickel ions have been considered impurities. Therefore, measures have been taken so as not to contain such metal ions in a plating solution. Specifically, plating equipment of a material quality that can suppress corrosion and dissolving by the plating solution has been used. Further, in a case where there is a large amount of impurities, so-called "contamination", the plating solution has been replaced.

As described above, the present inventors succeeded in increasing the hardness of a Zn—Ni alloy plating layer by a completely different method from the conventional methods. If the hardness of the Zn—Ni alloy plating layer is increased, the galling resistance of the threaded connection for pipes will increase.

In this connection, in some cases a threaded connection for pipes is required to have an excellent external appearance. Whether the external appearance is good or bad is determined based on the amount of light (glossiness) reflected by the surface of the threaded connection for pipes. If the level of glossiness is high, the external appearance is determined as being good.

Figure 4:
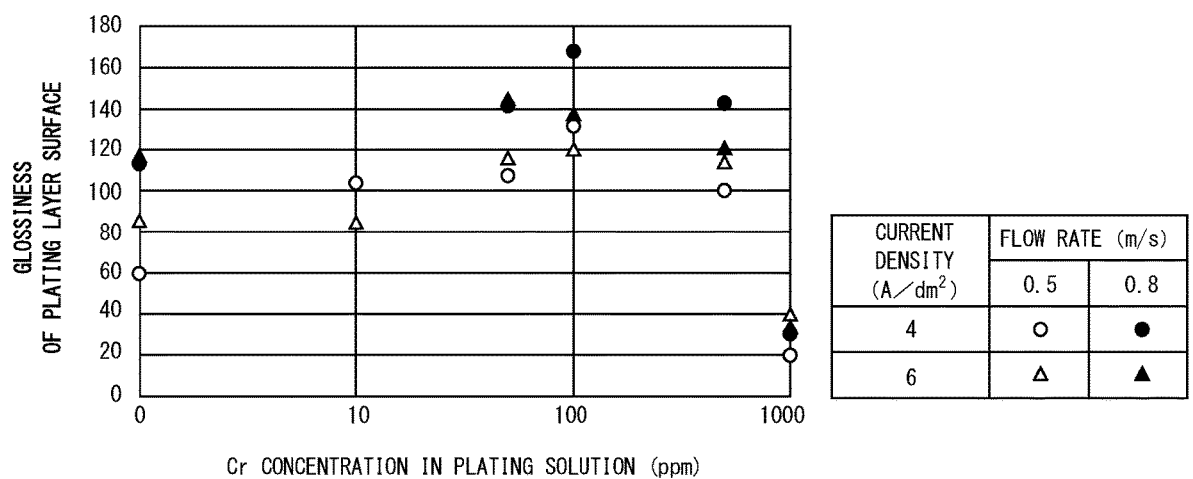
FIG. 4 is a chart illustrating the relation between a Cr concentration in a plating solution and the glossiness of the surface of a Zn—Ni alloy plating layer.

FIG. 4 is a chart illustrating the relation between the concentration of chromium ions in a plating solution and the glossiness of the surface of a Zn—Ni alloy plating layer formed by electrolytic plating using the relevant plating solution. The "glossiness of the plating layer surface" which is represented by the ordinate means the relative-specular glossiness in accordance with JIS Z 8741 (1997) of the Zn—Ni alloy plating layer surface. The "Cr concentration in the plating solution (ppm)" which is represented by the abscissa means the concentration (ppm) of chromium ions contained in the plating solution. The information illustrated in FIG. 4 was obtained based on examples that are described later. FIG. 4 shows results obtained by forming Zn—Ni alloy plating layers for which the concentration of chromium ions in the plating solution, the current density and the flow rate of the respective plating solutions were varied. In a case where the conditions for the current density and flow rate were the same, the plating layers are denoted by the same symbol. For example, in FIG. 2, a white circle symbol (○) means that a Zn—Ni alloy plating layer was formed under conditions of a current density of 4 A/dm' and a flow rate of 0.5 m/s.

Referring to FIG. 4, as the concentration of chromium ions in the plating solution increases from 0 ppm to 100 ppm, the glossiness of the Zn—Ni alloy plating layer surface also increases irrespective of the current density and flow rate. However, when the concentration of chromium ions in the plating solution becomes greater than 100 ppm, the glossiness of the Zn—Ni alloy plating layer surface decreases as the concentration of chromium ions in the plating solution increases. The glossiness of the Zn—Ni alloy plating layer surface is in a range of around 20 to 40 at a time point at which the concentration of the chromium ions in the plating solution reaches 1000 ppm. This is low in comparison to a glossiness in a range of around 60 to 120 of the Zn—Ni alloy plating layer surface when the concentration of chromium ions in the plating solution was 0 ppm.

It was thus found that the glossiness of the surface of the Zn—Ni alloy plating layer can be increased by making the concentration of chromium ions in the plating solution equal to or less than a certain value. In this case, in addition to being excellent in galling resistance, the threaded connection for pipes also has an excellent external appearance.

The threaded connection for pipes of the present embodiment that was completed based on the above findings includes a pin, a box and a Zn—Ni alloy plating layer. The pin has a pin-side contact surface that includes a pin-side thread part. The box has a box-side contact surface that includes a box-side thread part. The Zn—Ni alloy plating layer is formed on at least one of the pin-side contact surface and the box-side contact surface. The Zn—Ni alloy plating layer is consisting of Zn, Ni, trace amount of Cr and impurities. The trace amount of Cr content of the Zn—Ni alloy plating layer is 5.0×10 counts/sec or more in terms of Cr intensity as measured by secondary ion mass spectrometry using $O_2^+$ as bombarding ions.

The threaded connection for pipes of the present embodiment includes a Zn—Ni alloy plating layer. The Zn—Ni alloy plating layer contains a trace amount of Cr. The hardness of the Zn—Ni alloy plating layer is increased by the trace amount of Cr. By this means, the galling resistance of the threaded connection for pipes increases.

The glossiness of the aforementioned Zn—Ni alloy plating layer surface may be 100 or more.

When the glossiness of the Zn—Ni alloy plating layer surface is high, the threaded connection for pipes has an excellent external appearance in addition to excellent galling resistance.

The thickness of the aforementioned Zn—Ni alloy plating layer may be in a range of 1 to 20 μm.

The Vickers hardness Hv of the aforementioned Zn—Ni alloy plating layer may be 600 or more.

When the Vickers hardness Hv of the Zn—Ni alloy plating layer is 600 or more, the galling resistance of the threaded connection for pipes increases.

The aforementioned Zn—Ni alloy plating layer may contain 6.0 to 16.0 mass % of Ni, may include a γ phase, and a spacing of (411) planes of the γ phase may be 2.111 Å or more.

In this case, the hardness of the Zn—Ni alloy plating layer increases further.

The threaded connection for pipes may further include a lubricant coating on at least one of the pin-side contact surface, the box-side contact surface, and the Zn—Ni alloy plating layer.

In a case where the threaded connection for pipes includes a lubricant coating, the lubricity of the threaded connection for pipes increases.

In the aforementioned threaded connection for pipes, the pin-side contact surface may further include a pin-side metal seal part and a pin-side shoulder part. The box-side contact surface may further include a box-side metal seal part and a box-side shoulder part.

A method for producing a threaded connection for pipes of the present embodiment includes an immersion step and a current conduction step. In the immersion step, first, a pin having a pin-side contact surface including a pin-side thread part, and a box having a box-side contact surface including a box-side thread part are prepared. Next, at least one of the pin-side contact surface and the box-side contact surface is immersed in a plating solution. The plating solution contains zinc ions, nickel ions and chromium ions. A concentration of chromium ions in the plating solution is in a range of 30 to 2000 ppm. In the current conduction step, a current is conducted through at least one of the pin-side contact surface and the box-side contact surface that is immersed in the plating solution. By this means, a Zn—Ni alloy plating layer is formed on at least one of the pin-side contact surface and the box-side contact surface.

A threaded connection for pipes having a Zn—Ni alloy plating layer containing a trace amount of Cr can be produced by the aforementioned production method. The hardness of the Zn—Ni alloy plating layer is high. Therefore, the galling resistance of the threaded connection for pipes is high.

The concentration of chromium ions in the aforementioned plating solution may be in a range of 30 to 800 ppm.

When the upper limit of the concentration of chromium ions in the aforementioned plating solution is 800 ppm, in addition to excellent galling resistance, the threaded connection for pipes also has an excellent external appearance.

In the threaded connection for pipes produced by the aforementioned production method, the pin-side contact surface may further include a pin-side metal seal part and a pin-side shoulder part. The box-side contact surface may further include a box-side metal seal part and box-side shoulder part.

Hereunder, the threaded connection for pipes and the method for producing the threaded connection for pipes according to the present embodiment are described in detail.

[Threaded Connection for Pipes]

Figure 5:
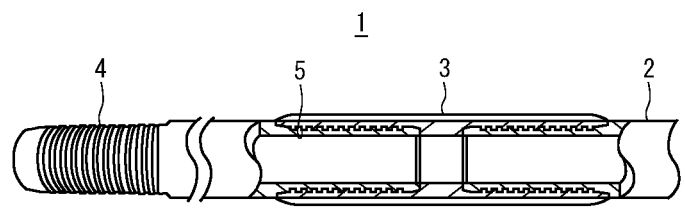
FIG. 5 is a view illustrating the configuration of a coupling-type threaded connection for pipes according to the present embodiment.

The threaded connection for pipes includes a pin and a box. FIG. 5 is a view illustrating a configuration of a threaded connection for pipes 1 according to the present embodiment. Referring to FIG. 5, the threaded connection for pipes 1 includes a steel pipe 2 and a coupling 3. A pin 4 is formed at each end of the steel pipe 2, and the pin 4 includes an external thread part in its outer surface. A box 5 is formed at each end of the coupling 3, and the box 5 includes an internal thread part in its inner surface. The coupling 3 is attached to the end of the steel pipe 2 by fastening the pin 4 and the box 5 together. Although not illustrated in the drawing, a pin 4 of the steel pipe 2 and a box 5 of the coupling 3 that are not coupled to a mating member may have a protector attached thereto to protect the respective thread parts thereof.

Figure 6:
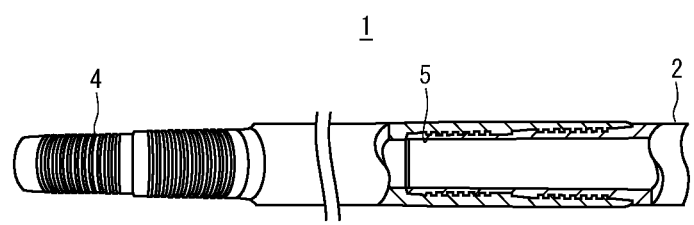
FIG. 6 is a view illustrating the configuration of an integral-type threaded connection for pipes according to the present embodiment.

On the other hand, an integral-type threaded connection for pipes 1 may also be used, in which the coupling 3 is not used and, instead, one of the ends of the steel pipe 2 is used as the pin 4, and the other end of the steel pipe 2 is used as the box 5. FIG. 6 is a view illustrating a configuration of an integral-type threaded connection for pipes 1 according to the present embodiment. Referring to FIG. 6, the threaded connection for pipes 1 includes a steel pipe 2. A pin 4 having an external thread part in its outer surface is formed at one end of the steel pipe 2. A box 5 having an internal thread part in its inner surface is formed at the other end of the steel pipe 2. Two of the steel pipes 2 can be connected by fastening the pin 4 and the box 5 together. The threaded connection for pipes 1 of the present embodiment can be used for both a coupling-type and an integral-type threaded connection for pipes 1.

Figure 7:
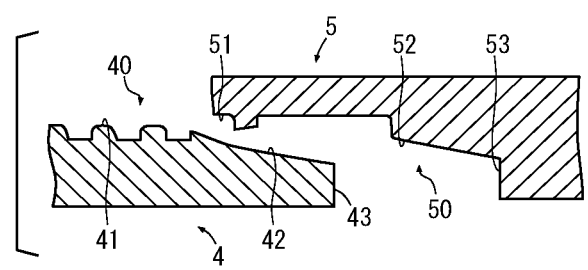
FIG. 7 is a cross-sectional view of an example of a threaded connection for pipes.

FIG. 7 is a cross-sectional view of the threaded connection for pipes 1. In FIG. 7, the pin 4 includes a pin-side thread part 41, a pin-side metal seal part 42 and a pin-side shoulder part 43. In FIG. 7, the box 5 includes a box-side thread part 51, a box-side metal seal part 52 and a box-side shoulder part 53. The portions at which the pin 4 and the box 5 come into contact with each other when they are fastened together are referred to as "contact surfaces 40 and 50". Specifically, when the pin 4 and the box 5 have been fastened to each other, the two thread parts (pin-side thread part 41 and box-side thread part 51) come into contact with each other, and so do the two metal seal parts (pin-side metal seal part 42 and box-side metal seal part 52) and the two shoulder parts (pin-side shoulder part 43 and box-side shoulder part 53). In FIG. 7, the pin-side contact surface 40 includes the pin-side thread part 41, the pin-side metal seal part 42 and the pin-side shoulder part 43. In FIG. 7, the box-side contact surface 50 includes the box-side thread part 51, the box-side metal seal part 52 and the box-side shoulder part 53.

In FIG. 7, in the pin 4, the pin-side shoulder part 43, the pin-side metal seal part 42 and the pin-side thread part 41 are arranged in that order from the end of the steel pipe 2. Further, in the box 5, the box-side thread part 51, the box-side metal seal part 52 and the box-side shoulder part 53 are arranged in that order from the end of the steel pipe 2 or the coupling 3. However, the arrangement of the pin-side thread part 41 and the box-side thread part 51, the pin-side metal seal part 42 and the box-side metal seal part 52, and the pin-side shoulder part 43 and the box-side shoulder part 53 is not limited to the arrangement illustrated in FIG. 7, and the arrangement can be changed as appropriate. For example, in the pin 4, the aforementioned parts may be arranged from the end of the steel pipe 2 in the order of the pin-side shoulder part 43, the pin-side metal seal part 42, the pin-side thread part 41, the pin-side metal seal part 42, the pin-side shoulder part 43, the pin-side metal seal part 42 and the pin-side thread part 41. In the box 5, the aforementioned parts may be arranged from the end of the steel pipe 2 or the coupling 3 in the order of the box-side thread part 51, the box-side metal seal part 52, the box-side shoulder part 53, the box-side metal seal part 52, the box-side thread part 51, the box-side metal seal part 52 and the box-side shoulder part 53.

Figure 8:
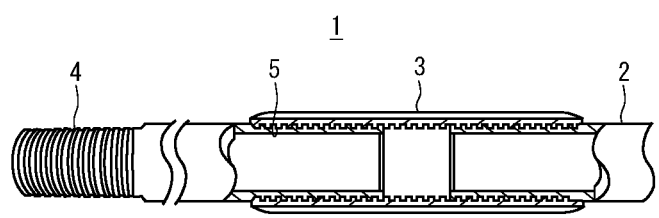
FIG. 8 is a view illustrating the configuration of a threaded connection for pipes according to the present embodiment in a case where the threaded connection for pipes does not have a metal seal part and a shoulder part.

In FIG. 5 and FIG. 6, so-called "premium connections" which include metal seal parts (pin-side metal seal part 42 and box-side metal seal part 52) and shoulder parts (pin-side shoulder part 43 and box-side shoulder part 53) are illustrated. However, the metal seal parts (pin-side metal seal part 42 and box-side metal seal part 52) and the shoulder parts (pin-side shoulder part 43 and box-side shoulder part 53) need not be included. An example of a threaded connection for pipes 1 that does not have the metal seal parts 42 and 52 and the shoulder parts 43 and 53 is illustrated in FIG. 8. The threaded connection for pipes 1 of the present embodiment is also favorably applicable as a threaded connection for pipes 1 which does not have the metal seal parts 42, 52 and the shoulder parts 43, 53. When the metal seal parts 42, 52 and the shoulder parts 43, 53 are not provided, the pin-side contact surface 40 includes the pin-side thread part 41, and the box-side contact surface 50 includes the box-side thread part 51.

Figure 9:
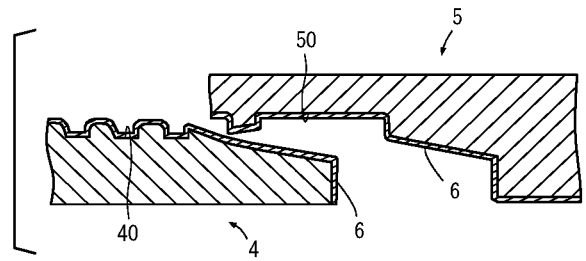
FIG. 9 is a cross-sectional view of an example of a threaded connection for pipes according to the present embodiment.
Figure 10:
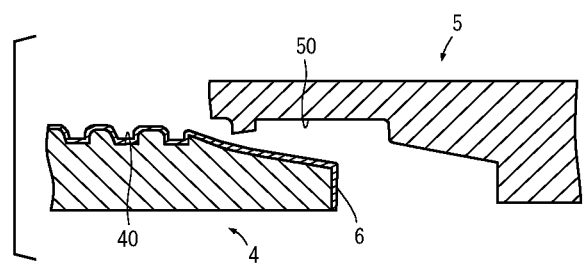
FIG. 10 is a cross-sectional view of an example of a threaded connection for pipes according to another embodiment that is different from the example in FIG. 9.
Figure 11:
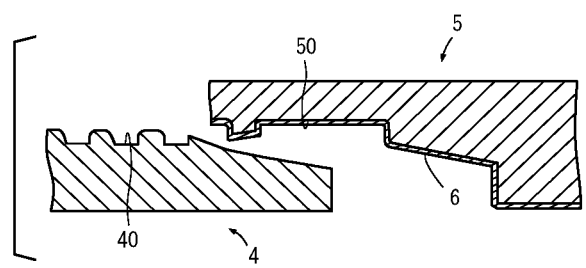
FIG. 11 is a cross-sectional view of an example of a threaded connection for pipes according to another embodiment that is different from the examples in FIG. 9 and FIG. 10.

FIG. 9 is a cross-sectional view of the threaded connection for pipes 1 of the present embodiment. Referring to FIG. 9, the threaded connection for pipes 1 includes the Zn—Ni alloy plating layer 6 on at least one of the pin-side contact surface 40 and the box-side contact surface 50. In FIG. 9, the threaded connection for pipes 1 includes the Zn—Ni alloy plating layer 6 on both the pin-side contact surface 40 and the box-side contact surface 50. However, as illustrated in FIG. 10, the threaded connection for pipes 1 may also include the Zn—Ni alloy plating layer 6 on only the pin-side contact surface 40. Further, as illustrated in FIG. 11, the threaded connection for pipes 1 may also include the Zn—Ni alloy plating layer 6 on only the box-side contact surface 50.

Further, the Zn—Ni alloy plating layer 6 may be formed on the entire pin-side contact surface 40 or box-side contact surface 50, or may be formed on only one part of the pin-side contact surface 40 or box-side contact surface 50. The Zn—Ni alloy plating layer 6 may also be formed only on the pin-side thread part 41. The Zn—Ni alloy plating layer 6 may also be formed only on the box-side thread part 51. In a case where the pin-side contact surface 40 has the pin-side metal seal part 42 and the pin-side shoulder part 43, the Zn—Ni alloy plating layer 6 may be formed only on the pin-side metal seal part 42 or may be formed only on the pin-side shoulder part 43. In a case where the box-side contact surface 50 has the box-side metal seal part 52 and the box-side shoulder part 53, the Zn—Ni alloy plating layer 6 may be formed only on the box-side metal seal part 52 or may be formed only on the box-side shoulder part 53.

[Zn—Ni Alloy Plating Layer]

The Zn—Ni alloy plating layer 6 is formed on at least one of the pin-side contact surface 40 and the box-side contact surface 50. The Zn—Ni alloy plating layer 6 is consisting of a Zn—Ni alloy and impurities. The Zn—Ni alloy is consisting of zinc (Zn), nickel (Ni), a trace amount of chromium (Cr) and impurities. Here, the impurities of the Zn—Ni alloy plating layer 6 and the impurities of the Zn—Ni alloy include substances that are other than Zn, Ni and Cr and which are contained in the Zn—Ni alloy plating layer 6 during production of the threaded connection for pipes, and whose contents are within a range that does not influence the effects of the present invention. The impurities are, for example, Fe and Cu.

[Composition of Zn—Ni Alloy Plating Layer]

When the overall chemical composition of the Zn—Ni alloy plating layer 6 is taken as 100 mass %, the Ni content is in a range of 6.0 to 20.0 mass %. In this case, the Zn—Ni alloy may sometimes become a mixed phase of η phase and γ phase. If the lower limit of the Ni content of the Zn—Ni alloy plating layer 6 is 10.0 mass %, the Zn—Ni alloy becomes a γ monophase. In this case, the hardness of the Zn—Ni alloy plating layer 6 further increases. Therefore, preferably, the lower limit of the Ni content of the Zn—Ni alloy plating layer 6 is 10.0 mass %, more preferably is 12.0 mass %, and further preferably is 14.0 mass %. Preferably, the upper limit of the Ni content of the Zn—Ni alloy plating layer 6 is 18.0 mass %, more preferably is 17.0 mass %, and further preferably is 16.0 mass %.

The Zn content is in a range of 80.0 to 94.0 mass %. A trace amount of Cr is contained in the Zn—Ni alloy plating layer 6. However, because the content of Cr is a trace amount, the composition of the Zn—Ni alloy plating layer 6 is mainly composed of Zn and Ni. A lower limit of the Zn content is preferably 82.0 mass %, more preferably is 83.0 mass %, and further preferably is 84.0 mass %. An upper limit of the Zn content is preferably 90.0 mass %, more preferably is 88.0 mass %, and further preferably is 86.0 mass %.

[Method of Measuring Composition of Zn—Ni Alloy Plating Layer 6]

The Ni content of the Zn—Ni alloy plating layer 6 is measured by the following method. The Ni content is measured using a hand-held fluorescent X-ray analyzer (DP2000 (trade name: DELTA Premium)) manufactured by JEOL Ltd.). The measurement analyzes the composition at four locations on the surface (four locations at 0°, 90°, 180° and 270° in the pipe circumferential direction of the threaded connection for pipes) of the Zn—Ni alloy plating layer 6. The measured contents of Zn and Ni were determined by an Alloy Plus mode. An amount obtained by dividing the measured content of Ni by the total amount of the measured contents of Zn and Ni that were determined was taken as the Ni content (mass %). The arithmetic mean of the measurement results for the four locations at which the composition was analyzed is adopted as the Ni content (mass %). The Zn content is also measured in the same way.

[Cr Content]

A trace amount of Cr is contained in the Zn—Ni alloy plating layer 6. Specifically, the Cr content is $5.0 \times 10$ counts/sec or more in terms of Cr intensity as measured by secondary ion mass spectrometry using $O_2^+$ as bombarding ions. Herein, the number of secondary ions of Cr detected by secondary ion mass spectrometry using $O_2^+$ as bombarding ions is referred to as "Cr intensity (counts/sec)". If the Cr intensity is $5.0 \times 10$ counts/sec or more, the hardness of the Zn—Ni alloy plating layer 6 increases.

The Cr content in the Zn—Ni alloy plating layer 6 is a very small amount. In some cases the Cr in the Zn—Ni alloy plating layer 6 cannot be detected by a common measurement method. The Cr in the Zn—Ni alloy plating layer 6 cannot be detected by fluorescent X-ray analysis. Therefore, the Cr content is measured by secondary ion mass spectrometry (SIMS), and is expressed as the Cr intensity (counts/sec). A lower limit of the Cr intensity is $5.0 \times 10$ counts/sec, more preferably is $1.0 \times 10^2$ counts/sec, and further preferably is $1.0 \times 10^3$ counts/sec. Although an upper limit of the Cr intensity is not particularly limited, for example the upper limit is $1.0 \times 10^{10}$ counts/sec.

[Method for Measuring Cr Intensity]

The Cr intensity of the Zn—Ni alloy plating layer 6 is measured by the following method. Measurement is performed using a quadrupole secondary ion mass spectrometer "PHI ADEPT-1010 (TM)" manufactured by ULVAC-PHI, Inc. The measurement conditions are as described below. Analysis in the depth direction is performed from the surface of the Zn—Ni alloy plating layer 6. The Cr intensity is the arithmetic mean value of measurement values at depths of 1.5 to 2.0 from the surface of the Zn—Ni alloy plating layer 6.

Vacuum degree: $5 \times 10^{-7}$ Pa or less
Bombarding ions: $O_2^+$
Accelerating voltage: 6.0 kV
Measurement range: 64 µm square (64 µm×64 µm)
Measurement frequency: each 20 nm in depth direction The depth is a numerical value obtained by converting the measurement time, that is, the sputtering time, to a depth. Conversion of the measurement time to a depth is performed as follows. After measurement, the depth of a crater produced by the measurement is measured. The crater depth is measured using a stylus profiler with the trade name P-17 Stylus Profiler that is manufactured by KLA-Tencor Corporation. The surface shape including the crater is measured, the difference of the surface height by the crater is measured, and make it the depth of the crater. A relational expression between the crater depth and the measurement time is created. Conversion to the depth (µm) at the measurement location is performed based on the measurement time and the aforementioned relational expression.

In a case where the Zn—Ni alloy plating layer 6 has another coating having a thickness of 1 µm or more thereon, secondary ion mass spectrometry is performed after removing the coating. In this case, the term "surface of the Zn—Ni alloy plating layer 6" means the surface of the Zn—Ni alloy plating layer 6 after the coating has been removed. The coating is, for example, a phosphate coating or a lubricant coating. In a case where the Zn—Ni alloy plating layer 6 has a phosphate coating thereon, the phosphate coating is dissolved and removed. Dissolution of the phosphate coating is performed using a commercially available stripping solution. The commercially available stripping solution is, for example, a chromic acid solution. A chromic acid solution contains an inhibitor. By using a stripping solution, only the phosphate coating is dissolved. In a case where the Zn—Ni alloy plating layer 6 has a lubricant coating thereon, the lubricant coating is removed. Removal of the lubricant coating can be performed by a well-known method such as dissolving using a solvent, wiping and high-pressure washing or dry ice blasting. In a case where the Zn—Ni alloy plating layer 6 has a chromate coating thereon, secondary ion mass spectrometry is performed without removing the chromate coating. In this case, the term "surface of the Zn—Ni alloy plating layer 6" means the surface of the chromate coating.

[Vickers hardness of Zn—Ni alloy plating layer]

In the Zn—Ni alloy plating layer 6 of the present embodiment, the Cr intensity is $5.0 \times 10$ counts/sec or more. Therefore, the Vickers hardness markedly increases. The Vickers hardness of the Zn—Ni alloy plating layer 6 of the present embodiment is shown by Formula (1):

$$\text{Vickers hardness (Hv)} \geq -300 + 55 \times \text{Ni} \quad (1)$$

where, Ni represents the Ni content (mass %) in the Zn—Ni alloy plating layer 6.

The lower limit of the Vickers hardness Hv of the Zn—Ni alloy plating layer 6 is preferably $-250+55\times\text{Ni}$, and more preferably is $-200+55\times\text{Ni}$. The higher that the upper limit of the Vickers hardness Hv of the Zn—Ni alloy plating layer 6 is, the more preferable it is. The upper limit of the Vickers hardness Hv of the Zn—Ni alloy plating layer 6 is, for example, $300+55\times\text{Ni}$.

More specifically, a lower limit of the Vickers hardness Hv of the Zn—Ni alloy plating layer 6 is preferably 400, more preferably is 500, further preferably is 600, further preferably is 650, and further preferably is 700. The higher that the upper limit of the Vickers hardness Hv of the Zn—Ni alloy plating layer 6 is, the more preferable it is. The upper limit of the Vickers hardness Hv of the Zn—Ni alloy plating layer 6 is, for example, 1200.

[Method for Measuring Vickers Hardness of Zn—Ni Alloy Plating Layer]

The Vickers hardness of the Zn—Ni alloy plating layer 6 is measured by the following method. The pin 4 or box 5 that has the Zn—Ni alloy plating layer 6 is prepared. The pin 4 or box 5 that has the Zn—Ni alloy plating layer 6 is cut perpendicularly to the axial direction. The Vickers hardness is measured by a method in accordance with JIS Z 2244 (2009) at five arbitrary points in a cross-section of the Zn—Ni alloy plating layer 6 that appeared when cutting was performed. A micro hardness tester with the trade name Fischerscope HM2000 manufactured by Fischer Instruments K. K. is used for the measurement. The test temperature is set to normal temperature (25° C.), and the test force (F) is set to 0.01 N. Among the five measurement results that are obtained, the arithmetic mean of measurement results obtained at three points that exclude the highest value and the lowest value is adopted as the Vickers hardness Hv (Hv 0.001) of the Zn—Ni alloy plating layer 6.

[Glossiness of Zn—Ni Alloy Plating Layer Surface]

Preferably, the glossiness of the surface of the Zn—Ni alloy plating layer 6 is 100 or more. Herein, the term "glossiness" refers to the relative-specular glossiness in a case where the relative-specular glossiness at an incident angle of 60° (specular reflectance $\rho_0$ ($\theta$)=0.1001) on a glass surface for which the refractive index in a constant value of 1.567 throughout the visible wavelength range, as defined in JIS Z 8741 (1997), is taken as 100%. If the glossiness of the surface of the Zn—Ni alloy plating layer 6 is 100 or more, the threaded connection for pipes will have an excellent external appearance. Preferably, the lower limit of the glossiness of the surface of the Zn—Ni alloy plating layer 6 is 105, and further preferably is 110. The higher that the upper limit of the glossiness of the surface of the Zn—Ni alloy plating layer 6 is, the more preferable it is. The glossiness of the surface of the Zn—Ni alloy plating layer 6 is, for example, 200.

[Method for Measuring Glossiness of Zn—Ni Alloy Plating Layer Surface]

The glossiness of the Zn—Ni alloy plating layer 6 surface is measured by the following method. The relative-specular glossiness is measured at an arbitrary two points on the Zn—Ni alloy plating layer 6 surface by a method in accordance with JIS Z 8741 (1997), using micro-TRI-gloss (portable gloss meter) manufactured by BYK-Gardner GmbH. The arithmetic mean of the obtained measurement values is adopted as the glossiness of the Zn—Ni alloy plating layer 6 surface.

The Zn—Ni alloy plating layer 6 is formed by a plating layer formation step that is described later. At this time, preferably, the Zn—Ni alloy plating layer 6 is formed by a plating treatment using a plating solution containing zinc ions, nickel ions and chromium ions, in which the concentration of chromium ions is in a range of 30 to 800 ppm. In this case, the glossiness of the Zn—Ni alloy plating layer 6 increases, and the threaded connection for pipes has an excellent external appearance in addition to excellent galling resistance.

[Thickness of Zn—Ni Alloy Plating Layer]

The thickness of the Zn—Ni alloy plating layer 6 is not particularly limited. The thickness of the Zn—Ni alloy plating layer 6 is, for example, in a range of 1 to 20 μm. If the thickness of the Zn—Ni alloy plating layer 6 is 1 μm or more, adequate galling resistance can be stably obtained. Even if the thickness of the Zn—Ni alloy plating layer 6 is more than 20 μm, the aforementioned effect will be saturated.

[Method for Measuring Thickness of Zn—Ni Alloy Plating Layer]

The thickness of the Zn—Ni alloy plating layer 6 is measured by the following method. The thickness of the Zn—Ni alloy plating layer 6 is measured at four locations on the contact surfaces 34 and 44 on which the Zn—Ni alloy plating layer 6 was formed, using an eddy current phase-type coating thickness gauge PHASCOPE PMP910 manufactured by Helmut Fischer GmbH. The measurement is performed by a method conforming to ISO (International Organization for Standardization) 21968 (2005). The measurement locations are four locations (four locations at 0°, 90°, 180° and 270°) in the pipe circumferential direction of the threaded connection for pipes. The arithmetic mean of the measurement results is adopted as the thickness of the Zn—Ni alloy plating layer 6.

[Crystal Structure of Zn—Ni Alloy Plating Layer]

The Zn—Ni alloy formed by plating includes an η phase, γ phase and α phase. The η phase is a phase with the chemical formula Zn that has a hexagonal crystal structure with lattice constants a=0.267 nm and c=0.495 nm. The γ phase is a phase with the chemical formula $Ni_5Zn_{21}$ that has a cubic crystal structure with the lattice constant α=0.890 nm. The α phase is a phase with the chemical formula Ni that has a face-centered cubic crystal structure with the lattice constant α=0.352 nm. The crystal structure of the Zn—Ni alloy plating layer 6 may be a mixed phase of these phases. However, if the crystal structure of the Zn—Ni alloy plating layer 6 is a γ monophase, the hardness increases further. Therefore, preferably the crystal structure of the Zn—Ni alloy plating layer 6 is a γ monophase.

[Method for Determining Crystal Structure of Zn—Ni Alloy Plating Layer]

The crystal structure of the Zn—Ni alloy plating layer 6 is determined by the following method. X-ray diffraction measurement is performed under the following measurement conditions with respect to the surface of the Zn—Ni alloy plating layer 6. Measured profiles that are obtained and values described in the ASTM cards are compared to determine the phases.

Apparatus: RINT-2500 manufactured by Rigaku Corporation

X-ray tube: Co-Kα radiation

Scan range: 2θ=10 to 110°

Scan step: 0.02°

Depending on the composition, the Zn—Ni alloy plating layer 6 contains a γ phase, ε phase and η phase. Hereunder, the spacing of (411) planes of the γ phase included in the Zn—Ni alloy plating layer 6 is referred to as the "interplanar spacing" of the Zn—Ni alloy plating layer 6. It is surmised that if the interplanar spacing of the Zn—Ni alloy plating layer 6 is wide, strain is imparted to the Zn—Ni alloy plating layer 6, and the hardness of the Zn—Ni alloy plating layer 6 increases. Therefore, the interplanar spacing of the Zn—Ni alloy plating layer 6 may be 2.111 Å or more.

As described above, the crystal structure of the Zn—Ni alloy plating layer 6 depends on the composition. Therefore, the interplanar spacing of the Zn—Ni alloy plating layer 6 is significantly influenced by the Ni content. The interplanar spacing of the Zn—Ni alloy plating layer 6 is also influenced by a trace amount of Cr. In a case where the chemical composition contains 6.0 to 16.0 mass % of Ni and a trace amount of Cr, the interplanar spacing of the Zn—Ni alloy plating layer 6 becomes 2.111 Å or more.

If the interplanar spacing of the Zn—Ni alloy plating layer 6 is 2.111 Å or more, the Vickers hardness Hv of the Zn—Ni alloy plating layer 6 will be 600 or more. In this case, the galling resistance of the threaded connection for pipes is further improved. Preferably, the lower limit of the interplanar spacing of the Zn—Ni alloy plating layer 6 is 2.112 Å, and more preferably is 2.113 Å. The upper limit of the interplanar spacing of the Zn—Ni alloy plating layer 6 is not particularly limited. However, the upper limit of the interplanar spacing of the Zn—Ni alloy plating layer 6 is, for example, 2.116 Å.

[Method of Measuring Spacing of (411) Planes of γ Phase in Zn—Ni Alloy Plating Layer]

The spacing of the (411) planes of the γ phase included in the Zn—Ni alloy plating layer 6 is measured by the following method. X-ray diffraction measurement is performed under the same conditions as used in the method for determining the crystal structure of the Zn—Ni alloy plating layer 6 that is mentioned above. Among the measured profiles that are obtained, fitting of diffraction data for 2θ=49.0 to 52.0° corresponding to the (411) plane is performed using the Lorentzian function. The Lorentzian function is given by Formula (2):

$$\text{Diffraction intensity (cps)}=PH/(1+(2\theta-PP)^2/FH^2)+BG \quad (2)$$

where, PH represents peak height (cps), PP represents peak location (deg), FH represents half-width (deg), BG represents background (cps), and 2θ represents the diffraction angle.

The square of a difference between the diffraction intensity of the measured profile and the intensity calculated by the Lorentzian function is integrated over the range of 2θ=49.0 to 52.0°, and the respective variables of PH, PP, FH and BG are optimized so that the total sum thereof becomes the minimum value. The Solver of the Excel software is used for optimization of the variables. The spacing of the (411) planes is calculated in accordance with Bragg law based on the optimized peak location PP (deg). The obtained value is adopted as the spacing (Å) of the (411) planes of the γ phase contained in the Zn—Ni alloy plating layer 6.

[Lubricant Coating]

Figure 12:
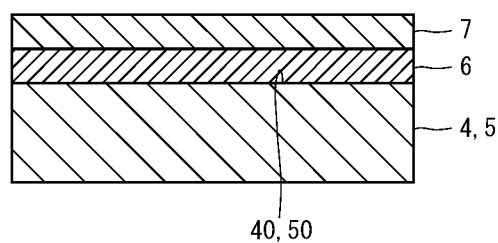
FIG. 12 is a cross-sectional view of a threaded connection for pipes in a case where the threaded connection for pipes includes a solid lubricant coating.

The aforementioned threaded connection for pipes may further include a lubricant coating 7 on at least one of the pin-side contact surface 40, the box-side contact surface 50 and the Zn—Ni alloy plating layer 6. In this case, the lubricity of the threaded connection for pipes increases. The lubricant coating 7 may be formed on both the Zn—Ni alloy plating layer 6 on the pin-side contact surface 40 and the Zn—Ni alloy plating layer 6 on the box-side contact surface 50, for example, as illustrated in FIG. 12. The lubricant coating 7 may be formed on only the Zn—Ni alloy plating layer 6 on the pin-side contact surface 40. The lubricant coating 7 may be formed on only the Zn—Ni alloy plating layer 6 on the box-side contact surface 50. The lubricant coating 7 may be formed directly on the pin-side contact surface 40 or the box-side contact surface 50. For example, in a case where the Zn—Ni alloy plating layer 6 is not to be formed on the pin-side contact surface 40 or the box-side contact surface 50, the lubricant coating 7 may be formed directly on the pin-side contact surface 40 or the box-side contact surface 50.

The lubricant coating 7 may be solid, or may be in a semi-solid state or a liquid state. A well-known lubricant can be used as the lubricant coating 7. The lubricant coating 7 contains, for example, lubricating particles and a binder. As necessary, the lubricant coating 7 may contain a solvent and other components.

There is no particular limitation with respect to the lubricating particles as long they are particles that have lubricity. The lubricating particles are, for example, one or more types selected from the group consisting of particles of graphite, $MoS_2$ (molybdenum disulfide), $WS_2$ (tungsten disulfide), BN (boron nitride), PTFE (polytetrafluoroethylene), CFx (graphite fluoride), and $CaCO_3$ (calcium carbonate). When the total content of components other than a solvent is taken as 100 mass %, the content of the lubricating particles is, for example, in a range of 1 to 50 mass %, and preferably is in a range of 5 to 30 mass %.

The binder, for example, is one type or two types selected from the group consisting of an organic binder and an inorganic binder. The organic binder is, for example, one type or two types selected from the group consisting of a thermosetting resin and a thermoplastic resin. The thermosetting resin, for example, is one or more types selected from the group consisting of polyethylene resin, polyimide resin and polyamide-imide resin. The inorganic binder is, for example, one type or two types selected from the group consisting of compounds containing alkoxysilane and siloxane bonds. When the total content of components other than a solvent is taken as 100 mass %, the content of the binder is, for example, in a range of 10 to 80 mass %, and preferably is in a range of 20 to 70 mass %.

As necessary, the lubricant coating 7 can contain other components. Examples of the other components include a rust preventing agent, a corrosion inhibitor, a surfactant, a wax, a friction modifier and a pigment. When the total content of components other than a solvent is taken as 100 mass %, the content of the other components is, for example, in a range of 3 to 45 mass % in total, and preferably is in a range of 10 to 40 mass % in total. The respective contents of the lubricating particles, the binder, the solvent and the other components are set as appropriate.

The lubricant is, for example, Seal-Guard™ ECF™ manufactured by Jet-Lube LLC. Other examples of the lubricant include lubricants containing rosin, metallic soap, wax or a lubricant powder. The chemical composition of the lubricant coating 7 that is formed on the pin-side contact surface 40, the chemical composition of the lubricant coating 7 that is formed on the box-side contact surface 50, and the chemical composition of the lubricant coating 7 that is formed on the Zn—Ni alloy plating layer 6 may be the same or may be different.

The thickness of the lubricant coating 7 is not particularly limited. The thickness of the lubricant coating 7 is, for example, in a range of 30 to 300 μm. If the thickness of the lubricant coating 7 is 30 μm or more, when fastening the threaded connection for pipes, an effect that lowers the torque value when the shoulder parts 43 and 53 contact together increases. Therefore, adjustment of the torque value during thread fastening is easy. Even if the thickness of the lubricant coating 7 is more than 300 μm, the aforementioned effect will be saturated because the surplus amount of the lubricant coating 7 will be removed from the top of the contact surfaces 40 and 50 during thread fastening.

The thickness of the lubricant coating 7 is measured by the following method. The pin 4 or the box 5 that includes the lubricant coating 7 is prepared. The pin 4 or the box 5 is cut perpendicularly to the axial direction of the pipe. A cross-section including the lubricant coating 7 is observed by microscope. The magnification when observing the cross-section by microscope is ×500. By this means, the thickness of the lubricant coating 7 is determined.

[Base Metal of Threaded Connection for Pipes]

The chemical composition of the base metal of the threaded connection for pipes is not particularly limited. Examples of the base metal include carbon steels, stainless steels and alloy steels. The alloy steel is, for example, a Ni alloy, and a duplex stainless steel containing an alloying element such as Cr, Ni or Mo.

[Production Method]

A method for producing the threaded connection for pipes of the present embodiment is a method for producing the threaded connection for pipes that is described above. The method for producing the threaded connection for pipes includes a preparation step and a plating layer formation step.

[Immersion Step]

In the immersion step, first, the pin 4, the box 5 and a plating solution are prepared. Next, at least one of the pin-side contact surface and the box-side contact surface is immersed in the plating solution. The pin 4 has the pin-side contact surface 40 that includes the pin-side thread part 41. The box 5 has the box-side contact surface 50 that includes the box-side thread part 51. The plating solution contains zinc ions, nickel ions and chromium ions. The concentration of the chromium ions is in the range of 30 to 2000 ppm. Since the plating solution contains chromium ions, a trace amount of Cr is incorporated into the Zn—Ni alloy plating layer 6. In this case, the hardness of the Zn—Ni alloy plating layer 6 increases, and thus the galling resistance of the threaded connection for pipes increases. Preferably, the plating solution contains zinc ions in a range of 1 to 100 g/L, and nickel ions in a range of 1 to 100 g/L.

The kinds of metal ions and the concentration of chromium ions in the plating solution is measured using a high-frequency inductively coupled plasma (ICP) emission spectrophotometer (iCAP6300) manufactured by Thermo Fisher Scientific Inc.

[Current Conduction Step]

In the current conduction step, a current is conducted through at least one of the pin-side contact surface 40 and the box-side contact surface 50 that is immersed in the plating solution. By this means the Zn—Ni alloy plating layer 6 is formed on at least one of the pin-side contact surface 40 and the box-side contact surface 50. In other words, the Zn—Ni alloy plating layer 6 is formed by electrolytic plating. The conditions of the electrolytic plating can be appropriately set. The conditions of the electrolytic plating are, for example, as follows: plating solution pH: 1 to 10, plating solution temperature: 10 to 60° C., current density: 1 to 100 A/dm', and treatment time: 0.1 to 30 minutes.

The concentration of chromium ions in the aforementioned plating solution may be in a range of 30 to 800 ppm. In this case, not only does the hardness of the Zn—Ni alloy plating layer 6 increase, but the glossiness of the surface thereof is 100 or more. Therefore, in addition to excellent galling resistance, the threaded connection for pipes has an excellent external appearance.

[Film Formation Step]

A film formation step may be performed after forming the aforementioned Zn—Ni alloy plating layer on at least one of the pin-side contact surface 40 and the box-side contact surface 50. In the film formation step, the lubricant coating 7 is formed on at least one location selected from the group consisting of the top of the pin-side contact surface 40, the top of the box-side contact surface 50, and the top of the Zn—Ni alloy plating layer 6.

The lubricant coating 7 can be formed on at least one location selected from the aforementioned group consisting of the top of the pin-side contact surface 40, the top of the box-side contact surface 50, and the top of the Zn—Ni alloy plating layer 6 by applying thereon a composition containing the aforementioned lubricating particles and binder. The application method is not particularly limited. Examples of the application method include spray coating, brushing, and immersion. When adopting spray coating as the application method, the composition may be heated and then sprayed in a state in which the flowability has been increased. Although the lubricant coating 7 may be formed on one part of the contact surface, it is preferable to uniformly form the lubricant coating 7 on the entire contact surface. The film formation step may be performed on both of the pin 4 and the box 5, or may be performed on only one of the pin 4 and the box 5.

[Preconditioning Treatment Step]

As necessary, the aforementioned production method may include a preconditioning treatment step before the immersion step. The preconditioning treatment step includes, for example, pickling and alkali degreasing. In the preconditioning treatment step, oil or the like adhering to the contact surface is removed. The preconditioning treatment step may further include a grinding step such as sandblasting or finishing by machine grinding. Only one kind of these preconditioning treatments may be performed, or a plurality of the preconditioning treatments may be performed in combination.

Examples

Examples are described hereunder. In the examples, the contact surface of the pin is referred to as the "pin surface", and the contact surface of the box is referred to as the "box surface". Further, in the examples, the "%" symbol means "mass percent".

[Preparation Step]

In the present examples, commercially available cold-rolled steel plates were used based on the assumption of use as a base metal for a threaded connection. Each cold-rolled steel plate had the following dimensions: length of 150 mm, width of 100 mm, and thickness of 0.8 mm. A region of 100 mm in length×100 mm in width on the surface of each cold-rolled steel plate was subjected to plating. The steel type was ultra-low carbon steel.

Next, a plating solution was prepared. The plating solution used was DAIN Zinalloy N2 (trade name) manufactured by Daiwa Fine Chemicals Co., Ltd. The chromium ion concentration of the plating solution of each Test No. was adjusted by dissolving chromium chloride (III) hexahydrate ($CrCl_3.6H_2O$) in the plating solution. Note that, the term "Cr concentration in plating solution (ppm)" in Table 1 refers to the concentration (ppm) of chromium ions in the plating solution, and the numerical value thereof is a target value. A value of 0 for "Cr concentration in plating solution (ppm)" means that the aforementioned chromium chloride (III) hexahydrate was not added to the plating solution.

[Plating Layer Formation Step]

The prepared plating solution was used to form a Zn—Ni alloy plating layer on the cold-rolled steel plate of each Test No. Formation of the Zn—Ni alloy plating layer was performed by electrolytic plating. The electrolytic plating was performed under conditions of a plating solution pH in a range of 3 to 6, a plating solution temperature in a range of 30 to 40° C., and a treatment time in a range of 5 to 20 minutes. The other test conditions of the respective Test Nos. are shown in Table 1. In Table 1, the term "plating solution flow rate (m/s)" refers to the agitating speed of the plating solution, and is a value that shows, in terms of the linear velocity of the plating solution, the circulating volume in a case where the plating solution was circulated with a pump.

TABLE 1

| | Plating Conditions | | | Zn—Ni Alloy Plating Layer | |
| --- | --- | --- | --- | --- | --- |
| | Cr | Plating | | | |
| Test No. | Concentration in Plating Solution (ppm) | Solution Flow Rate (m/s) | Current Density ($A/dm^2$) | Ni Content (wt %) | Cr Intensity (counts/sec) |
| 1 | 50 | 0.5 | 4 | 15.4 | — |
| 2 | 50 | 0.5 | 6 | 15.5 | $3.8 \times 10^2$ |
| 3 | 50 | 0.8 | 4 | 15.3 | — |

TABLE 1-continued

| | | | | | |
|---|---|---|---|---|---|
| 4 | 50 | 0.8 | 6 | 15.2 | — |
| 5 | 100 | 0.5 | 4 | 15.3 | — |
| 6 | 100 | 0.5 | 6 | 15.2 | $3.3 \times 10^2$ |
| 7 | 100 | 0.8 | 4 | 15.1 | — |
| 8 | 100 | 0.8 | 6 | 15.0 | — |
| 9 | 500 | 0.5 | 4 | 15.1 | — |
| 10 | 500 | 0.5 | 6 | 14.8 | $5.0 \times 10^3$ |
| 11 | 500 | 0.8 | 4 | 14.8 | — |
| 12 | 500 | 0.8 | 6 | 15.1 | — |
| 13 | 1000 | 0.5 | 4 | 14.8 | — |
| 14 | 1000 | 0.5 | 6 | 14.4 | $1.1 \times 10^5$ |
| 15 | 1000 | 0.8 | 4 | 15.1 | — |
| 16 | 1000 | 0.8 | 6 | 15.0 | — |
| 17 | 0 | 0.5 | 4 | 15.9 | — |
| 18 | 0 | 0.5 | 6 | 15.9 | $1.0 \times 10^0$ |
| 19 | 0 | 0.8 | 4 | 15.8 | — |
| 20 | 0 | 0.8 | 6 | 15.7 | — |
| 21 | 10 | 0.5 | 4 | 15.7 | — |
| 22 | 10 | 0.5 | 6 | 15.8 | $3.6 \times 10^1$ |

| | Zn—Ni Alloy Plating Layer | | | | |
|---|---|---|---|---|---|
| Test No. | Formula (1) (Hv) | Hardness (Hv) | Glossiness | Thickness (μm) | Interplanar Spacing (Å) |
| 1 | 547 | 737 | 107.5 | 8.1 | 2.111 |
| 2 | 553 | 744 | 116.0 | 8.3 | 2.111 |
| 3 | 542 | 629 | 141.5 | 8.1 | 2.111 |
| 4 | 536 | 715 | 144.5 | 7.5 | 2.112 |
| 5 | 542 | 731 | 131.5 | 7.4 | 2.111 |
| 6 | 536 | 815 | 120.5 | 7.9 | 2.112 |
| 7 | 531 | 771 | 168.0 | 8.3 | 2.111 |
| 8 | 525 | 770 | 137.5 | 7.9 | 2.112 |
| 9 | 531 | 939 | 100.5 | 7.6 | 2.113 |
| 10 | 514 | 803 | 114.5 | 7.9 | 2.113 |
| 11 | 514 | 758 | 143.0 | 8.3 | 2.114 |
| 12 | 531 | 1051 | 121.0 | 7.9 | 2.114 |
| 13 | 514 | 1010 | 20.0 | 6.9 | 2.115 |
| 14 | 492 | 947 | 39.7 | 6.9 | 2.114 |
| 15 | 531 | 997 | 30.5 | 6.7 | 2.115 |
| 16 | 525 | 1063 | 33.3 | 4.6 | 2.115 |
| 17 | 575 | 432 | 59.7 | 8.1 | 2.109 |
| 18 | 575 | 451 | 85.9 | 7.6 | 2.110 |
| 19 | 569 | 556 | 113.5 | 8.3 | 2.109 |
| 20 | 564 | 463 | 116.5 | 7.6 | 2.110 |
| 21 | 564 | 492 | 104.0 | 8.3 | 2.110 |
| 22 | 569 | 450 | 84.7 | 8.6 | 2.110 |

[Zn—Ni Alloy Plating Layer Composition Measurement Test]

The composition of the Zn—Ni alloy plating layer was measured by the following method. Measurement was performed using a hand-held fluorescent X-ray analyzer (DP2000 (trade name: DELTA Premium) manufactured by JEOL Ltd.). In the measurement, the composition was analyzed at an arbitrary four locations on the surface of the cold-rolled steel plate on which the Zn—Ni alloy plating layer was formed. The measured contents of Zn and Ni were determined by an Alloy Plus mode. An amount obtained by dividing the measured content of Ni by the total amount of the measured contents of Zn and Ni that were determined was taken as the Ni content (mass %). The results are shown in Table 1. The Cr content was measured in a similar manner. However, in analysis performed by means of X-ray fluorescence, in all of the examples the Cr content was lower than the detection limit.

[Test to Measure Cr Intensity of Zn—Ni Alloy Plating Layer]

The Cr intensity of the Zn—Ni alloy plating layer was measured by the following method in Test No 2, Test No. 6, Test No. 10, Test No. 14, Test No. 18 and Test No. 22. Measurement was performed using a quadrupole secondary ion mass spectrometer PHI ADEPT-1010 (TM) manufactured by ULVAC-PHI, Inc. The measurement conditions were as described below. Analysis was performed in the depth direction from the surface of the Zn—Ni alloy plating layer. An arithmetic mean value of the measurement values for the Cr intensity at depths of 1.5 to 2.0 μm from the surface of the Zn—Ni alloy plating layer is shown in Table 1.

Figure 13:
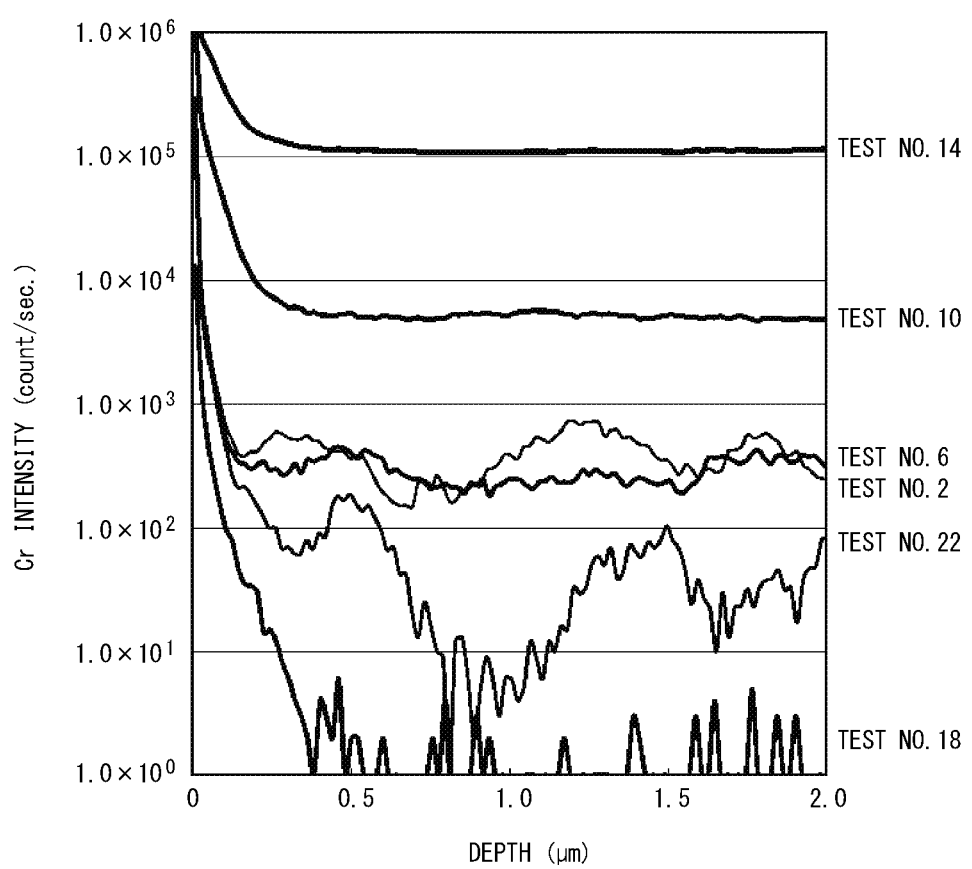
FIG. 13 is a graph showing measurement results of secondary ion mass spectrometry performed in Test Nos. 2, 6, 10, 14, 18 and 22.

Bombarding ions: $O_2^+$
Accelerating voltage: 6.0 kV
Measurement range: 64 μm
Measurement frequency: every 20 nm in depth direction
Measurement elements: Zn, Ni, Cr The results of the secondary ion mass spectrometry are shown in FIG. 13. In FIG. 13, the abscissa represents the depth. Here, the term "depth" refers to a depth (μm) obtained by conversion from the measurement time by the method described above. The ordinate represents the secondary ion intensity. The data is FIG. 13 shows results obtained by measurement after additionally forming a chromate coating on the respective Zn—Ni alloy plating layers of Test No. 2, Test No. 6, Test No. 10, Test No. 14 Test No. 18 and Test No. 22. Therefore, in the vicinity of the outer layer (depth of 0 μm to approximately 0.4 μm) for each data items, Cr of the chromate coating was detected and the Cr intensity was high.

[Test to Measure Vickers Hardness of Zn—Ni Alloy Plating Layer]

Each cold-rolled steel plate on which the Zn—Ni alloy plating layer was formed was cut perpendicularly to the surface, and the Vickers hardness (Hv) was measured by the aforementioned method at a cross-section of the Zn—Ni alloy plating layer that appeared when cutting was performed. The results are shown in the "hardness (Hv)" column in Table 1. Further, a Vickers hardness (Hv) that was calculated based on the aforementioned Formula (1) and the Ni content is shown in the "Formula (1)" column.

[Test to Measure Glossiness of Zn—Ni Alloy Plating Layer Surface]

The glossiness of the surface of each cold-rolled steel plate on which a Zn—Ni alloy plating layer was formed was measured by the method described above. The results are shown in Table 1.

[Test to Measure Zn—Ni Thickness of Alloy Plating Layer]

The method described above was used to perform a measurement test at an arbitrary four locations on the surface of each cold-rolled steel plate on which the Zn—Ni alloy plating layer was formed to thereby measure the thickness of the Zn—Ni alloy plating layer. The results are shown in Table 1.

[X-Ray Diffraction Measurement Test for Zn—Ni Alloy Plating Layer]

X-ray diffraction measurement was performed under the aforementioned measurement conditions with respect to the surface of each cold-rolled steel plate on which the Zn—Ni alloy plating layer was formed. The measured profiles that were obtained were compared with values described in the ASTM cards to determine the phases. The results showed that all of the examples were γ monophase structures. Further, based on the measured profiles that were obtained, peak locations PP (deg) corresponding to (411) planes were calculated by the method described above. The spacing (Å) of the (411) planes of the γ phase included in the Zn—Ni alloy plating layer was then determined. The results are shown in the "interplanar spacing (Å)" column in Table 1.

[Evaluation Results]

There is a correlation between the hardness and the galling resistance of the Zn—Ni alloy plating layer. Therefore, if the Vickers hardness Hv of the Zn—Ni alloy plating layer is high, the galling resistance thereof will be excellent. Referring to Table 1, for the cold-rolled steel plates of Test No. 1 to Test No. 16, the Zn—Ni alloy plating layer was formed with a plating solution containing chromium ions having a concentration of 30 ppm or more. Therefore, the Cr intensity of the Zn—Ni alloy plating layer was 5.0×10 counts/sec or more and the Vickers hardness Hv increased. Specifically, the Vickers hardness was higher than the Vickers hardness calculated based on Formula (1) and the Ni content. In other words, the cold-rolled steel plates of Test No. 1 to Test No. 16 exhibited excellent galling resistance.

In addition, on the cold-rolled steel plates of Test No. 1 to Test No. 12, a Zn—Ni alloy plating layer was formed using a plating solution having a chromium ion concentration of 800 ppm or less. As a result, the glossiness was 100.0 or more, and therefore, in addition to excellent galling resistance, the cold-rolled steel plates had an excellent external appearance.

Furthermore, in the cold-rolled steel plates of Test No. 1 to Test No. 16, the interplanar spacing of (411) planes of they phase was 2.111 Å or more. As a result, the Vickers hardness Hv was 600 or more, and therefore, further excellent galling resistance was exhibited.

On the other hand, for the cold-rolled steel plates of Test No. 17 to Test No. 22, a Zn—Ni alloy plating layer was formed using a plating solution having a chromium ion concentration of less than 30 ppm. Therefore, the Cr intensity of the Zn—Ni alloy plating layer was less than 5.0×10. As a result, the Vickers hardness was lower than the Vickers hardness calculated based on Formula (1) and the Ni content, and the galling resistance was poor.

An embodiment of the present invention has been described above. However, the foregoing embodiment is merely an example for implementing the present invention. Accordingly, the present invention is not limited to the above embodiment, and the above embodiment can be appropriately modified within a range which does not deviate from the gist of the present invention.

REFERENCE SIGNS LIST

1 Threaded connection for pipes
2 Steel pipe
3 Coupling
4 Pin
5 Box
6 Zn—Ni alloy plating layer
7 Lubricant coating
40 Pin-side contact surface
41 Pin-side thread part
42 Pin-side metal seal part
43 Pin-side shoulder part
50 Box-side contact surface
51 Box-side thread part
52 Box-side metal seal part
53 Box-side shoulder part

The invention claimed is:

1. A threaded connection for pipes, comprising:
a pin having a pin-side contact surface including a pin-side thread part;
a box having a box-side contact surface including a box-side thread part; and
a Zn—Ni alloy plating layer formed on at least one of the pin-side contact surface and the box-side contact surface, the Zn—Ni alloy plating layer is consisting of Zn, Ni, trace amount of Cr and impurities, wherein a content of the trace amount of Cr is $5.0 \times 10$ to $1.0 \times 10^{10}$ counts/sec in terms of Cr intensity as measured by secondary ion mass spectrometry using $O_2^+$ ions as bombarding ions.

2. The threaded connection for pipes according to claim 1, wherein:
a glossiness of the Zn—Ni alloy plating layer surface is 100 or more.

3. The threaded connection for pipes according to claim 1, wherein:
a thickness of the Zn—Ni alloy plating layer is 1 to 20 µm.

4. The threaded connection for pipes according to claim 2, wherein:
a thickness of the Zn—Ni alloy plating layer is 1 to 20 µm.

5. The threaded connection for pipes according to claim 1, wherein:
a Vickers hardness Hv of the Zn—Ni alloy plating layer is 600 or more.

6. The threaded connection for pipes according to claim 2, wherein:
a Vickers hardness Hv of the Zn—Ni alloy plating layer is 600 or more.

7. The threaded connection for pipes according to claim 3, wherein:
a Vickers hardness Hv of the Zn—Ni alloy plating layer is 600 or more.

8. The threaded connection for pipes according to claim 4, wherein:
a Vickers hardness Hv of the Zn—Ni alloy plating layer is 600 or more.

9. The threaded connection for pipes according to claim 1, wherein:
the Zn—Ni alloy plating layer contains 6.0 to 16.0 mass % of Ni and includes a γ phase, and a spacing of (411) planes of the γ phase is 2.111 Å or more.

10. The threaded connection for pipes according to claim 2, wherein:
the Zn—Ni alloy plating layer contains 6.0 to 16.0 mass % of Ni and includes a γ phase, and a spacing of (411) planes of the γ phase is 2.111 Å or more.

11. The threaded connection for pipes according to claim 3, wherein:
the Zn—Ni alloy plating layer contains 6.0 to 16.0 mass % of Ni and includes a γ phase, and a spacing of (411) planes of the γ phase is 2.111 Å or more.

12. The threaded connection for pipes according to claim 4, wherein:
the Zn—Ni alloy plating layer contains 6.0 to 16.0 mass % of Ni and includes a γ phase, and a spacing of (411) planes of the γ phase is 2.111 Å or more.

13. The threaded connection for pipes according to claim 5, wherein:
the Zn—Ni alloy plating layer contains 6.0 to 16.0 mass % of Ni and includes a γ phase, and a spacing of (411) planes of the γ phase is 2.111 Å or more.

14. The threaded connection for pipes according to claim 6, wherein:
the Zn—Ni alloy plating layer contains 6.0 to 16.0 mass % of Ni and includes a γ phase, and a spacing of (411) planes of the γ phase is 2.111 Å or more.

15. The threaded connection for pipes according to claim 7, wherein:
the Zn—Ni alloy plating layer contains 6.0 to 16.0 mass % of Ni and includes a γ phase, and a spacing of (411) planes of the γ phase is 2.111 Å or more.

16. The threaded connection for pipes according to claim 8, wherein:
the Zn—Ni alloy plating layer contains 6.0 to 16.0 mass % of Ni and includes a γ phase, and a spacing of (411) planes of the γ phase is 2.111 Å or more.

17. The threaded connection for pipes according to claim 1, further comprising:
a lubricant coating on at least one of the pin-side contact surface, the box-side contact surface, and the Zn—Ni alloy plating layer.

18. The threaded connection for pipes according to claim 1, wherein:
the pin-side contact surface further includes a pin-side metal seal part and a pin-side shoulder part; and
the box-side contact surface further includes a box-side metal seal part and a box-side shoulder part.

19. A method for producing the threaded connection for pipes according to claim 1, comprising the steps of:
preparing a pin having a pin-side contact surface including a pin-side thread part, and a box having a box-side contact surface including a box-side thread part, and immersing at least one of the pin-side contact surface and the box-side contact surface in a plating solution that contains zinc ions, nickel ions and chromium (III) ions, wherein a concentration of the chromium (III) ions is 30 to 2000 ppm; and
conducting a current through at least one of the pin-side contact surface and the box-side contact surface that is immersed in the plating solution to form a Zn-Ni alloy plating layer on at least one of the pin-side contact surface and the box-side contact surface.

20. The method for producing a threaded connection for pipes according to claim 19, wherein:
a concentration of the chromium (III) ions in the plating solution is in a range of 30 to 800 ppm.

21. The method for producing a threaded connection for pipes according to claim 19, wherein:
the pin-side contact surface further includes a pin-side metal seal part and a pin-side shoulder part, and
the box-side contact surface further includes a box-side metal seal part and a box-side shoulder part.

22. The method for producing a threaded connection for pipes according to claim 20, wherein:
the pin-side contact surface further includes a pin-side metal seal part and a pin-side shoulder part, and
the box-side contact surface further includes a box-side metal seal part and a box-side shoulder part.

* * * * *